Oct. 7, 1952 G. C. RAZOR 2,612,701
GEAR TOOTH LEAD TESTING DEVICE
Filed Oct. 29, 1945 2 SHEETS—SHEET 2
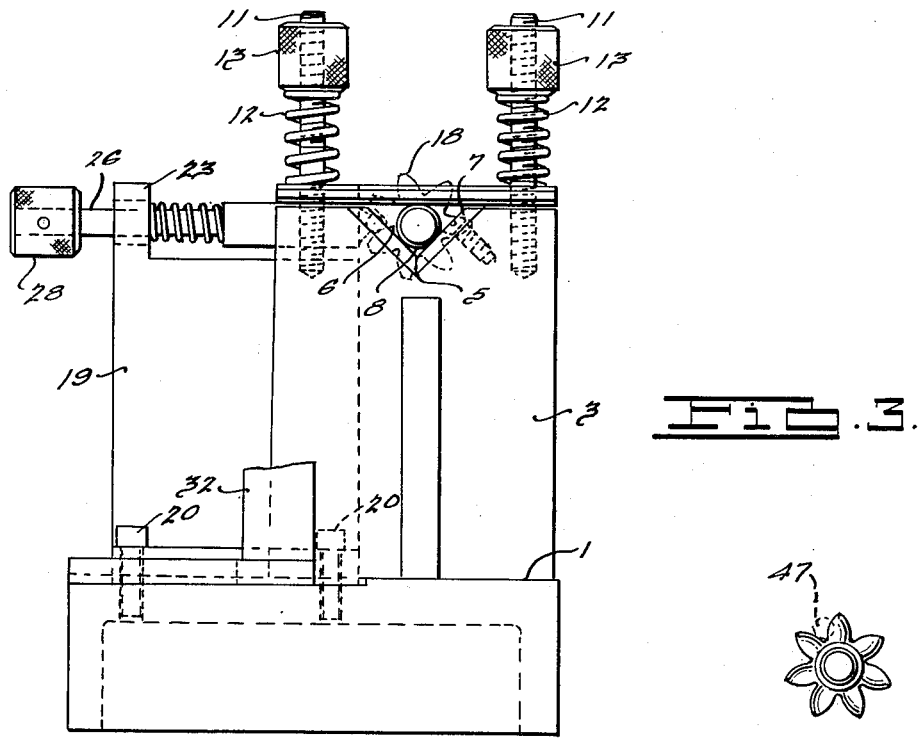
Fig. 3.
Fig. 5.
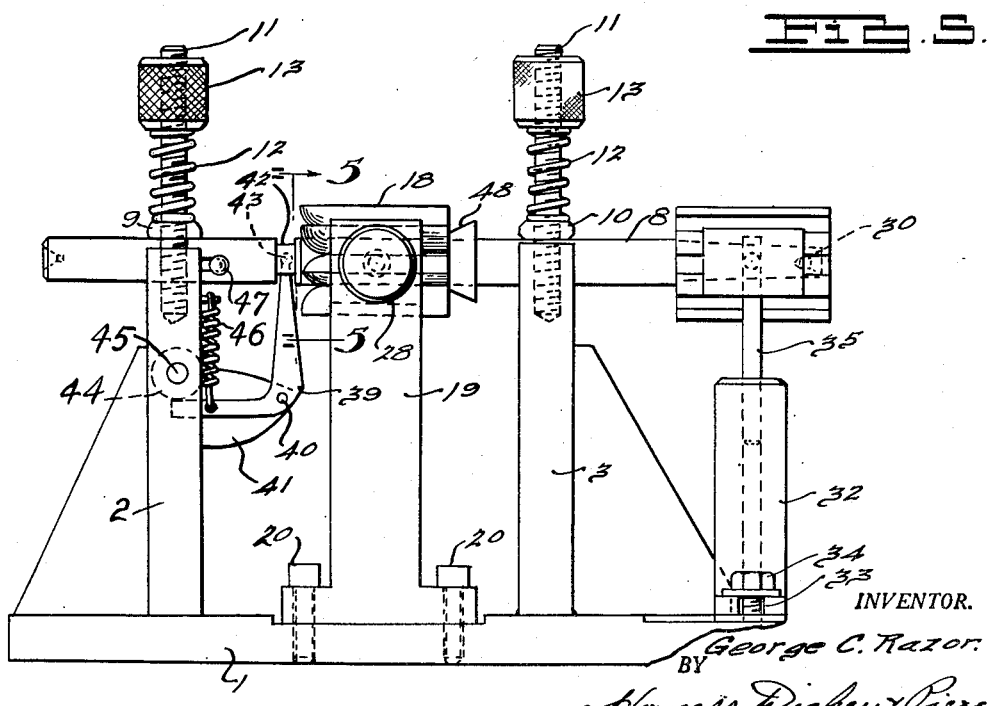
Fig. 4.
INVENTOR.
George C. Razor.
BY Harness, Dickey & Pierce
ATTORNEYS.

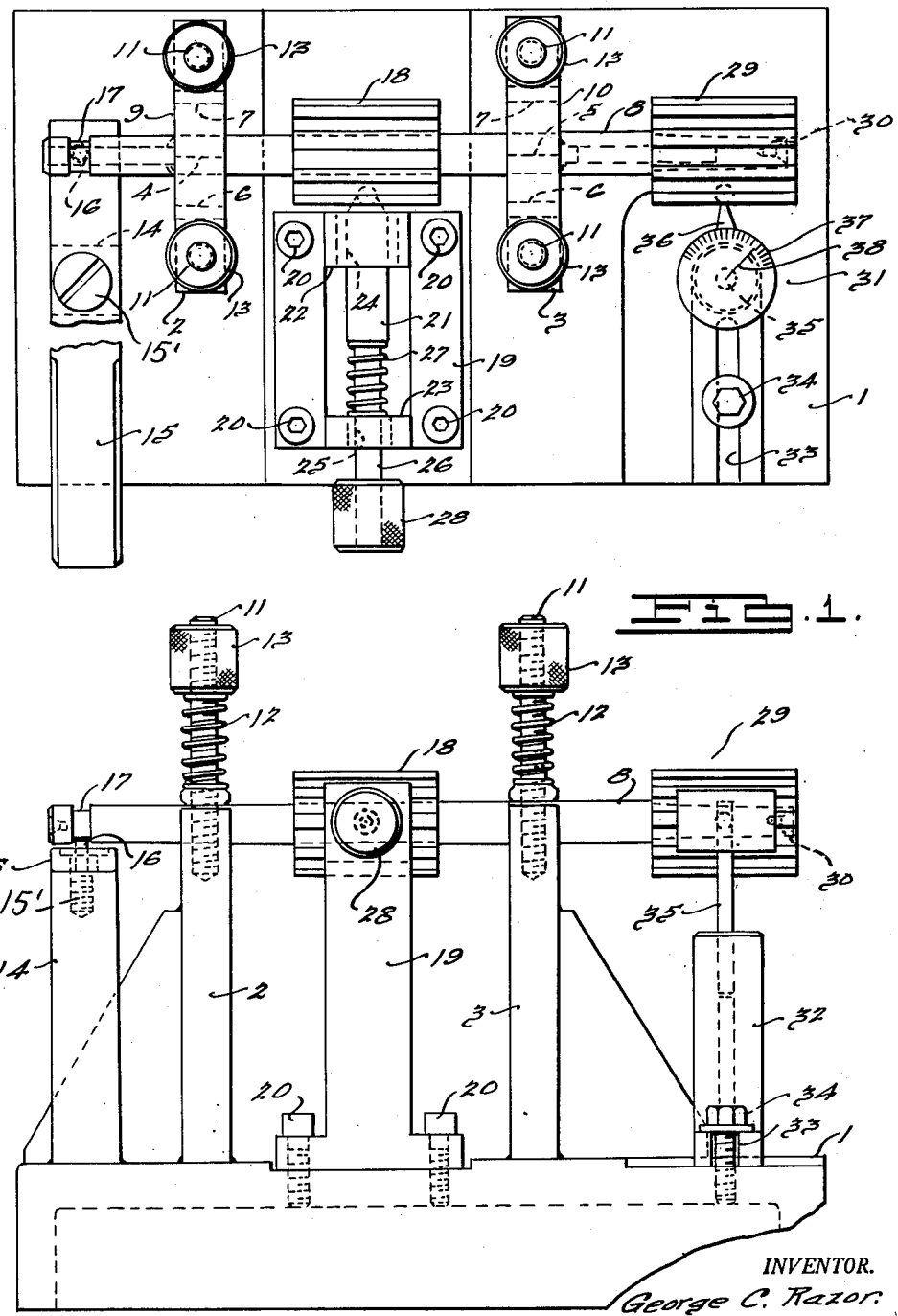

Patented Oct. 7, 1952

2,612,701

UNITED STATES PATENT OFFICE 2,612,701

GEAR TOOTH LEAD TESTING DEVICE

George C. Razor, Detroit, Mich., assignor to Michigan Tool Company, Detroit, Mich., a corporation of Delaware Application October 29, 1945, Serial No. 625,139

2 Claims. (Cl. 33—179.5)

The present invention relates to testing apparatus and, more particularly, to a device for comparatively checking the lead on gear teeth.

Various lead testing devices are commercially available. However, such are expensive and represent an investment which is not warranted where only a few gears are to be checked. They are also complicated and require considerable time to set up and can only be satisfactorily used by a skilled operator.

Therefore, a low cost testing device, sufficiently simple in operation to be used by relatively unskilled or semiskilled labor to quickly and accurately check the lead on gear teeth, will have great appeal to gear manufacturers.

The primary object of this invention is to provide a gear tooth lead testing device which requires little set up and which permits mounting or dismounting of the gear to be checked without disturbing the balance of the apparatus. To accomplish this, the gear to be checked is supported on a tapered, overhanging end of a mandrel thereon.

Another object of this invention is to provide a construction with which the lead on gear teeth may be checked by comparison with a master gear or a master element having a helical groove. To accomplish this, the master gear or the master element and gear to be checked are mounted upon a reciprocable mandrel, rotation of which is effected by said master gear or master element, in order that the gear might be checked as it moves therewith.

A further object of this invention is to provide a low-cost gear tooth lead testing device which may be operated by relatively unskilled or semiskilled labor to quickly and accurately check the lead on gear teeth.

Further objects and advantages of my invention will be apparent from the description which follows when considered in connection with the accompanying drawings in which like numerals indicate like parts wherever shown and wherein:

Figure 1 is a plan view of a gear tooth lead testing device showing the improvements of my invention.

Figure 2 is a front elevation of the device shown in Figure 1.

Figure 3 is a right side elevation of the device shown in Figure 1, with the indicator support broken away, showing clearly one of the V-shaped apertures provided to support the mandrel.

Figure 4 is a front elevation of a modification of my invention.

Figure 5 is an elevational view taken on line 5—5 of Figure 4 to more clearly show the tapered ends provided for the teeth used in the modified construction as depicted in Figure 4.

With this gear tooth lead testing device, a master gear or master element and a gear to be checked are rotatably mounted on a reciprocable mandrel. A follower contacts the master gear or master element whichever is used. An indicator with a feeler element similarly contacts the gear. Thus, as the mandrel reciprocates, the master gear or master element and gear to be checked move relative to the follower and indicator. The follower, following the lead of the master gear or element effects the rotation of the mandrel in accordance with said lead, and with it the gear to be checked, permitting the indicator to check the lead thereon.

For a detailed description of the apparatus, the figures show a base generally indicated at 1. This base may be an integral casting suitable for mounting the apparatus on a table or other standard and provides a substantially flat, plate-like surface to which are anchored in spaced and parallel relation two upwardly directed supports 2 and 3. Such supports are each provided, at their upper edges, with V-shaped apertures 4 and 5, one of which is clearly indicated in Figure 3. These apertures have edges 6 and 7 which serve to support a mandrel 8 for reciprocation and rotation therein. Bars 9 and 10 overlying the upper edges of these supports are guided for movement on studs 11 and are constantly and yieldingly urged toward the mandrel by means of coil springs 12 held under compression between the bars and nuts 13 which threadably engage said studs and thus yieldingly maintain said mandrel within said V-apertures. It is also pointed out that the mandrel overhangs such supports.

At the left end of the base, as viewed in Figures 1 and 2, is a post 14 anchored to the base. At the upper end of the post, an operating lever 15 is pivotally mounted as by means of fulcrum screw 15'. The lever has at its inner end a pin 16 which engages in an annular groove 17 on the periphery of the mandrel at one of its overhanging ends. It will be quite obvious that upon oscillating the lever, the mandrel 8 will be reciprocated without restricting its rotation.

A master gear 18 is secured to this mandrel between the spaced supports 2 and 3. While a master gear is shown and described, it is obviously possible to use, in many instances, a master or guiding element having a single helical groove, the side walls of which have a helix angle corresponding to the helix angle of the gear to be checked. Thus mounted on the mandrel, the master gear or element is laterally positioned with respect to another support 19 anchored by means of bolts 20 to the base 1. This support carries a follower consisting of a plunger 21 arranged in radial relation with respect to the axis of the mandrel and master gear, its end adapted to engage the flanks of the teeth of the master gear or the side walls of the helical groove on a master element, depending, of course, upon which is used. This support further provides two upwardly directed arms 22 and 23, with openings 24 and 25 respectively. A screw 26 projects through opening 25 in arm 23 and a coil spring 27, surrounding said screw, is held under compression between the inner face of arm 23 and the adjacent face of plunger 21 to constantly and yieldingly urge the follower in contact with the master gear. Inasmuch as this screw 26 threadably engages a tapped opening in plunger 21, it will be observed that the follower may be removed from the master gear by pulling the plunger outwardly away from said master gear by means of knob 28 on said screw when desired.

With the master gear thus mounted and provided for, a gear to be checked, indicated at 29, may be secured to the mandrel. In order to mount this gear in such manner that the balance of the apparatus will not be disturbed, the same is mounted upon the other overhanging end of the mandrel. Said mandrel is provided thereat with a very slightly tapered outer end 30 upon which to dispose the gear so as to be rotated and reciprocated therewith. It is to be understood, of course, that this gear is supposed to be of the same size and character as that of the master gear to which it is to be compared.

This checking of said gear is accomplished by means of an indicator 31 mounted upon a fourth support 32. Such support is mounted upon the base perpendicular to the mandrel and opposite tapered portion 30. Said support is provided with a slot 33 through which bolt 34 extends to permit adjustment toward and away from the mandrel and carries a post 35 upon which the indicator 31 is adapted to be placed. Such indicator is the conventional type provided with a feeler element 36 which has an end of the same shape as that on the follower plunger. A dial 37 and pointer 38 on the face thereof indicate the movement, if any, of the feeler. This feeler on the indicator is disposed to contact the gear to be checked in a manner similar to that in which the follower contacts the master gear. The indicator 31 is then set preferably to zero and the lever 15 oscillated. This effects reciprocation of the mandrel and the master gear and gear to be checked relative to the follower and indicator. Simultaneously, the follower serves to cause the mandrel to rotate in accordance with the lead of the master gear and, of course, effects the rotation of the gear to be checked therewith. If the lead on said gear is the same as that of the master gear or master element, the pointer 38 on indicator 31 remains stationary. If the lead on the gear varies from that on the master gear or master element, then the movement of the pointer as read on the dial 37 indicates the extent of such deviation.

Instead of employing the lever 15 to reciprocate the mandrel, an alternate construction may be provided as shown in Figure 4. This comprises a bell crank 39 pivotally mounted at 40 upon ear 41 projecting from support 2. One arm of the bell crank engages mandrel 8 in substantially the same manner as lever 15 engages it. That is to say, an annular groove 42 is provided in the periphery of mandrel 8 adapted to receive pin 43 in the end of the arm of the bell crank. The other end of the bell crank engages a cam 44 mounted for rotation upon shaft 45 in support 2. A coil spring 46 may be provided for constantly maintaining this end of the bell crank in engagement with the cam. Thus, when the cam is rotated, by any suitable means such as a crank at the end of shaft 45, the oscillating movement imparted thereto will effect reciprocation of the mandrel.

A further modification is also possible to cause the mandrel 8 to rotate a definite amount each time it reciprocates axially. In this case, the left end of the teeth on the master gear 18 are beveled or pointed as indicated in Figure 5. On the support 2, a ball 47 or rounded member is secured in a plane parallel to the longitudinal axis of the mandrel in position to engage one of the pointed ends of the teeth on the master gear each time the mandrel is moved to its leftward limit of movement. This ball is positioned off center of such teeth, as indicated in Figure 5, so that as the gear engages the same, it will rotate the master gear through a part of a tooth angle. At the opposite end of said master gear, a tapered collar 48 is fixed to the mandrel so that when the master gear moves to the left, the follower will pass out beyond the right end of said gear onto collar 48 just before the tapered teeth on the left end engage the ball 47. This frees the master gear, permitting it to rotate a partial turn due to engagement with the ball 47. As soon as said master gear moves in the opposite direction, the follower will engage in the next interdental space on the master gear and move it to its correct angular position. Thus, with this construction, and for instance where the cam 44 is employed and proportioned to provide the proper axial movement to the mandrel, each time the mandrel reciprocates it will be rotated so as to bring the next tooth of the gear to be checked into operative engagement with feeler 36 on indicator 31.

It will be clear from the foregoing description that the gear tooth lead testing device shown in the drawings and described above has been illustrated and described in rather specific detail. Obviously, many modifications, changes, and departures from the above described construction may be made without departing from the generic spirit and scope of the invention as set forth in the subjoined claims.

What is claimed is:

1. Apparatus for checking the lead of gear teeth comprising a base, a mandrel mounted for reciprocable movement thereon, said mandrel serving to rotatably support a gear to be checked, a master gear secured to said mandrel, said master gear having the teeth thereof tapered at one end, a tapered collar mounted on said mandrel coaxially with said master gear and abutting the axial end of said gear opposite to the end having the tapered teeth, a follower mounted on said base contacting the flanks of the teeth of the master gear, a rounded member mounted on said base in a plane parallel to the longitudinal axis of said mandrel and spaced from said follower member by a distance slightly greater than the axial length of said master gear, said tapered collar being tapered sufficiently to permit rotation of said master gear when the said follower is in engagement therewith, said mandrel being axially movable with respect to said base whereby when said follower leaves engagement with the teeth of said master gear said rounded member will engage the tapered ends of said gear teeth in offset relationship to the extremity of the taper on the ends of said teeth whereby to cause sufficient rotation of said master gear to permit said follower to enter the next adjacent interdental space in said master gear on return axial movement of said mandrel and means on said base to check the lead of said gear to be checked.

2. Apparatus for checking the lead of the teeth of a gear, said apparatus comprising a base, a mandrel mounted for reciprocable movement longitudinally of said base, said mandrel serving to provide a rotatable support for a gear to be checked, a master gear secured to said mandrel and coaxially arranged with respect to said gear to be checked, said master gear having the teeth thereof tapered at one axial end, a tapered collar mounted on said mandrel coaxially with said master gear adjacent the axial end of said master gear supports the end having the tapered teeth, a follower mounted on said base contacting the flanks of the teeth of the master gear, a rounded member mounted on said base in a plane parallel to the axis of said mandrel and spaced from said follower member by a distance slightly greater the axial length of said master gear, said tapered collar being tapered sufficiently to permit rotation of said master gear when said follower is in engagement therewith, said mandrel being axially movable with respect to said base whereby when said follower leaves engagement with the teeth of said master gear, said rounded member will engage the tapered ends of said gear teeth in offset relationship to the extremity of the taper on the ends of said teeth whereby to cause sufficient rotation of said master gear to permit said follower to enter the next adjacent interdental space in said master gear on return axial movement of said mandrel, and means on said base to engage the teeth of said gear to be checked in order to determine the accuracy of the lead thereof.

GEORGE C. RAZOR.

REFERENCES CITED

The following references are of record in the file of this patent:

UNITED STATES PATENTS

| Number | Name | Date |
|---|---|---|
| 1,701,184 | Hansen | Feb. 5, 1929 |
| 1,854,244 | Allison | Apr. 19, 1932 |
| 2,057,970 | Pelphrey | Oct. 20, 1936 |
| 2,202,638 | Praeg | May 28, 1940 |